US007012506B2

(12) United States Patent
Rich et al.

(10) Patent No.: US 7,012,506 B2
(45) Date of Patent: Mar. 14, 2006

(54) ULTRASONIC PEST REPELLER

(75) Inventors: Christopher T. Rich, Leola, PA (US); Erika L. Kneller, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 126 days.

(21) Appl. No.: 10/772,394

(22) Filed: Feb. 6, 2004

(65) Prior Publication Data

US 2004/0201459 A1    Oct. 14, 2004

Related U.S. Application Data

(60) Provisional application No. 60/462,290, filed on Apr. 14, 2003.

(51) Int. Cl.
*G08B 3/10*    (2006.01)
(52) U.S. Cl. .............................. 340/384.2; 340/573.1; 340/693.5; 340/693.9
(58) Field of Classification Search ............. 340/384.2, 340/573.1
See application file for complete search history.

(56) References Cited

U.S. PATENT DOCUMENTS

| | | | | |
|---|---|---|---|---|
| 3,961,684 A | * | 6/1976 | Michael et al. ............. | 181/143 |
| 4,091,383 A | | 5/1978 | Rainville | |
| 4,757,544 A | * | 7/1988 | Guy ........................... | 381/387 |
| 4,953,223 A | * | 8/1990 | Householder ............... | 381/387 |
| 5,943,430 A | * | 8/1999 | Saitoh ........................ | 381/160 |
| 6,301,194 B1 | * | 10/2001 | Cauchy ...................... | 367/139 |
| 2003/0201874 A1 | * | 10/2003 | Wu ........................ | 340/384.2 |

FOREIGN PATENT DOCUMENTS

| | | |
|---|---|---|
| DE | 25 14 780 | 10/1976 |
| EP | 1 157 610 | 11/2001 |
| FR | 2 676 618 | 11/1992 |
| GB | 1 517 493 | 7/1978 |
| WO | 86/02526 | 5/1986 |
| WO | WO 86/02526 | * 5/1986 |

OTHER PUBLICATIONS

SonicTechnology Products, INc., PestChaser Model PC2020 Dual Speaker Electronic Rodent Repeller with 6'Cord.
Lentek, Pest Contro Ultrasonic & Electromagnetic.

* cited by examiner

*Primary Examiner*—Daniel Wu
*Assistant Examiner*—Travis Hunnings
(74) *Attorney, Agent, or Firm*—Jacobson Holman PLLC

(57) ABSTRACT

A pest repeller including at least a first ultrasound transmitter mounted on a base and a second transmitter rotatably mounted above the first transmitter. Both transmitters can be rotatably mounted on a common post carried by the base. The arrangements permit a greater ultrasound coverage of an area because of the relative rotation of the superimposed speakers.

19 Claims, 3 Drawing Sheets

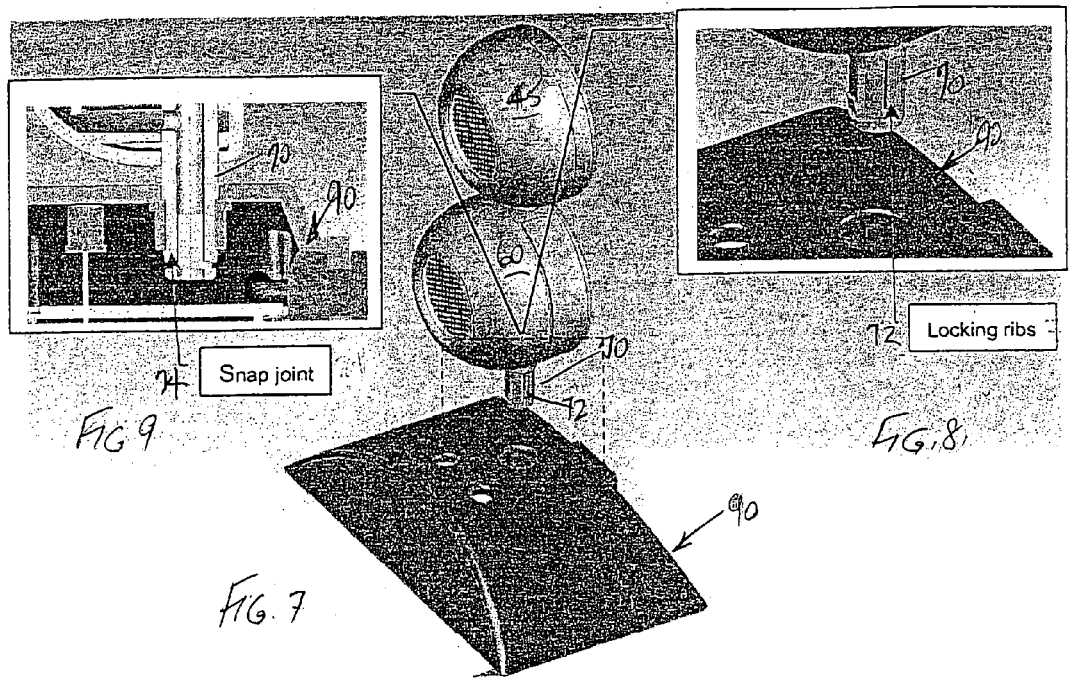
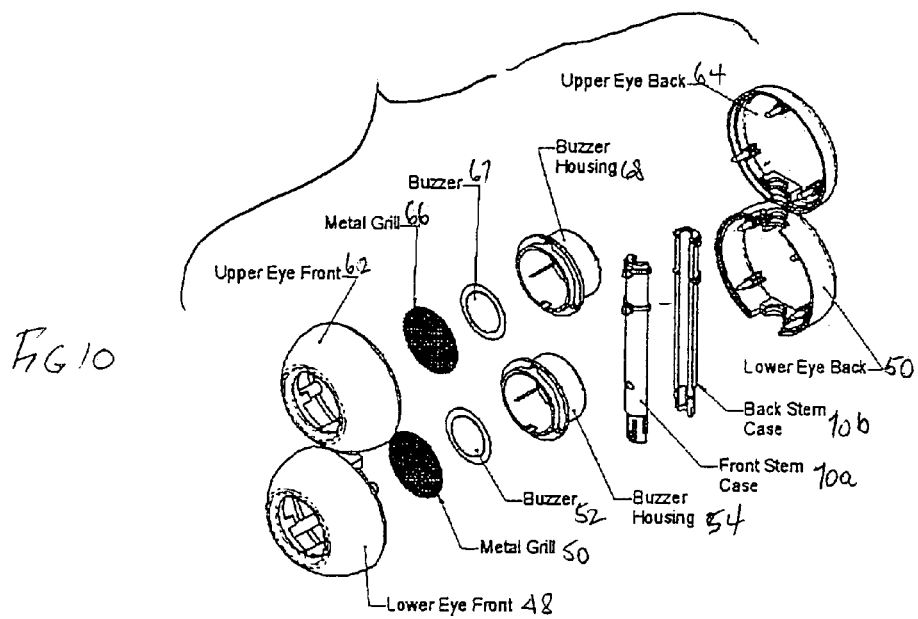

ULTRASONIC PEST REPELLER

This is a complete application claiming benefit of provisional application Ser. No. 60/462,290 filed Apr. 14, 2003.

BACKGROUND OF THE INVENTION

1. Technical Field

This invention relates to pest repellers, and relates more particularly to devices for broadcasting electronically-generated ultrasonic sound waves at a high volume to repel household pests, particularly rodents.

2. Discussion of the Prior Art

Household pests, such as mice, rats and the like, are a common problem, both domestically and commercially. Attempts to deal with the nuisance caused by these pests include the use of snap-traps that, unless located in protected areas can be harmful to children and pets, and insecticides, both liquid and powder, some of which include dangerous poisons. Notwithstanding these age-old solutions, mice and rats continue to multiply and thrive.

Rather than capturing or killing rodents, products have been marketed which simply repel these pests, causing them to avoid or leave areas that might otherwise attract them, such as kitchen cupboards, pantries or basements. Commercially available ultrasound transmitters emit sound waves with frequencies generally too high to be heard by the human ear, but high enough to annoy or repel rodents, directing them away from areas which they tend to frequent, and possibly toward areas where they can more readily and safely be trapped or otherwise eliminated.

Ultrasonic sound is highly directional and will be reflected by hard surfaces. Ultrasonic sound waves act more like light than sound from a radio. The waves travel from a transducer in a cone-like shape and leave "shadows" behind objects in their path, such as furniture, curtains or the like. The shadows are areas of non-coverage.

Products currently in the market are of two general styles, "direct plug-in" and "table top". The cone-shape emitted from the transducer covers approximately 120°. The direct plug-ins are limited in their useful coverage area because of the fixed relationship between the electrical connection used to power the unit from household current, and the sound producing transducers. Effectively, the useful coverage is dictated by the location of the wall outlet and the existing objects in the room.

The table top versions contain an electrical cord and plug and, inherently, have more potential for useful coverage because they can be positioned by the consumer to avoid obstructions that may be present if the unit is plugged directly into a wall outlet.

Dual transducer (speaker) units have been marketed to further increase the useful coverage in both direct plug-in and table top models. These units employ two positionally fixed, side-by-side, transducers positioned generally at about 30° from each other. Such units provide, effectively, 150° of coverage since the areas of overlap have no more effective sound than a single covered area because the amplitude or volume properties, measured in decibels, of the sound waves are not additive. Thus, the net effect of adding the second fixed transducer to the unit is only, on the order, of about 30° of extra coverage.

It would be highly desirable to provide an ultrasonic pest repeller having substantially increased coverage potential without taking up significantly more room, and with little or no additional cost.

OBJECTS AND SUMMARY OF THE INVENTION

It is, therefore, a principal object of this invention to provide an ultrasonic pest repeller which permits the consumer to adjust the radial position of two or more speakers relative to each other in a manner which allows infinite separation between the transducers thereby expanding the effective repelling zone significantly over the single, or positionally-fixed, multiple products currently in the market.

Another object of this invention is to provide an embodiment of an ultrasonic rodent repeller, whether of a direct plug-in or table top version, wherein either one speaker can be fixed, and the second speaker rotatably-positioned on the top of the fixed speaker, or an even further improved embodiment wherein both speakers are rotationally-mounted about a single base or support. With the use of the single rotationally-mounted embodiment, the upper speaker can be rotated to be offset up to 90° in either direction from the lower speaker providing a maximum potential of 210° coverage (when the speakers are offset 90° from each other). With an embodiment wherein two speakers are rotatably-mounted with respect to a fixed base, a total coverage of 240° is possible if the speakers are offset from 120°–180° with respect to each other.

Yet a further object of this invention is to provide an ultrasonic rodent repeller comprising at least two transducers rotatably-mounted vertically with respect to each other to emit ultrasonic sound waves over a large area in a simple and inexpensive manner, offering greater versatility since the consumer can position the speakers relative to each other in a manner to minimize shadows or areas of non-coverage.

A still further object of this invention is to provide a multiple speaker pest repeller of the plug-in or table top version that can be powered from any standard wall outlet, operated inexpensively, will not interfere with radio or television sets, electrical appliances, garage door openers or pacemakers, and yet will broadcast an acoustically hostile environment to targeted pests which is harmless to humans, most domestic pets (although it may be annoying to hamsters, gerbils, guinea pigs and rabbits), farm animals, birds or fish.

Yet another object of this invention is to provide a highly versatile, multiple speaker, rodent repeller that can be effectively combined with other pest control methods to help drive the targeted pets toward safely-placed traps or poisoned bait which may be outside the ultrasonically-protected area, resulting in a more rapid eradication.

Yet another object of this invention is the provision of a simple snap and lock mechanism between a base element and a vertical stem, with at least two ultrasonic transmitters rotatably-mounted on the stem for infinite adjustment relative to each other.

Upon further study of the specification, additional objects and advantages of this invention will become apparent to those skilled in the art.

BRIEF DESCRIPTION OF THE DRAWINGS

These and other objects, features and many of the attendant advantages of this invention will be better understood by those with ordinary skill in the art in connection with the following detailed description of the preferred embodiments and the accompanying drawings wherein:

Like reference characters refer to like parts throughout the several views of the drawings.

FIG. 7 is a partially exploded perspective view of the dual unit, ultrasonic pest repeller of FIGS. 4–6 illustrating the manner in which the vertical stem carrying the speakers would be seated in a base assembly;

FIG. 8 is an enlarged perspective view showing the locking ribs on the vertical stem adapted to interengage in the base unit;

FIG. 9 is an enlarged schematic cross-sectional view through a portion of the dual unit, ultrasonic pest repeller shown in FIG. 7 illustrating the "snap-joint" between the vertical stem and the base unit;

FIG. 10 is an exploded schematic view showing the elements forming the speaker assemblies of the preferred embodiment of this invention.

Like reference characters refer to like parts throughout the several views of the drawings.

DETAILED DESCRIPTION OF THE
PREFERRED EMBODIMENTS

The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation of the preferred apparatus shown and described. Rather, all suitable modifications and equivalents may be resorted to, falling within the scope of the invention.

Figure 1:
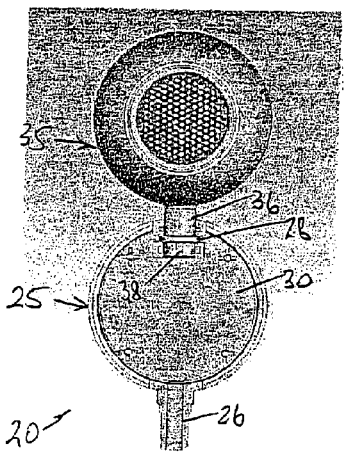
FIG. 1 is a front elevational view of a first embodiment of a dual unit, ultrasonic pest repeller with the cover removed from the lower or fixed unit.
Figure 2:
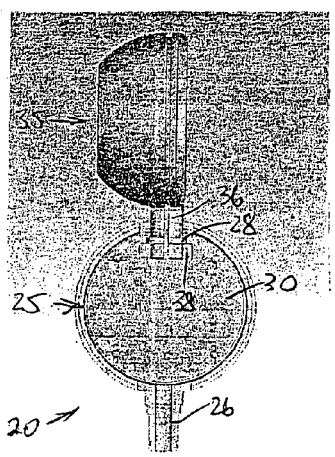
FIG. 2 is a view similar to FIG. 1, with the upper unit rotated in a 90° direction to the right.
Figure 3:
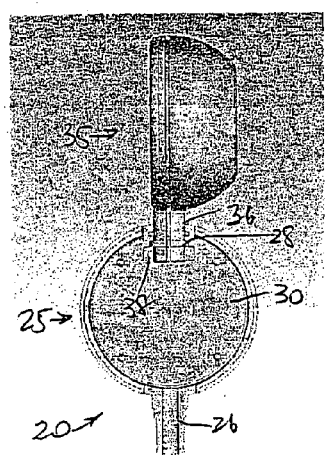
FIG. 3 is a view similar to FIG. 1, with the upper unit rotated in a 90° direction to the left.
Figure 4:
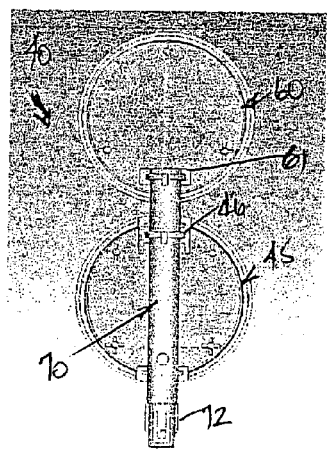
FIG. 4 is a front elevational view of a preferred embodiment of a dual unit, ultrasonic pest repeller according to the instant invention with the cover of both the upper and lower speakers removed.
Figure 5:
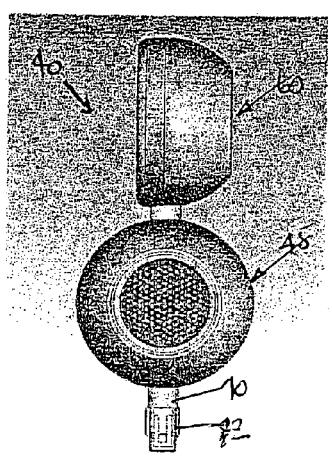
FIG. 5 is a view of the device of FIG. 4 with the covers replaced and with the upper unit rotated 90° to the left.
Figure 6:
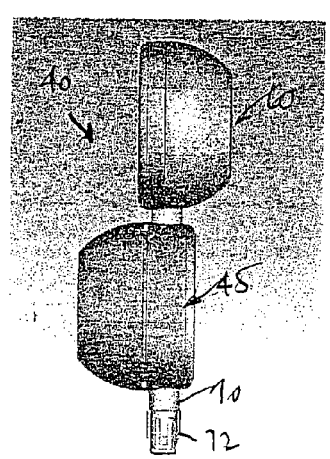
FIG. 6 is a view similar to FIG. 5 with the lower unit rotated 90° to the right.

Referring now to FIGS. 1–3, a first embodiment of a dual speaker pest repeller according to the instant inventive concepts is designated generally by the reference numeral 20 and comprises a lower, fixed speaker 25 (shown with the cover removed for illustrative clarity) having a downwardly depending stem 26, and a rotatably-supported, upper speaker 35 having a downwardly depending stem 36. The base for this unit is not shown, but will be similar to that discussed below with respect to the second embodiment of this invention and may include a "snap-joint" support for the stem 26 of the lower speaker unit 25. A wire from a power unit (not shown in this embodiment) may pass through the hollow stem 26 to be electrically connected to the transducer (not shown) of the lower speaker unit 25 and may then pass through the rotatably-supported hollow stem 36 of the upper speaker unit 35 to power the transducer therein. The electrical connections are well within the skill of the art.

As seen in FIGS. 1–3, the stem 36 of the upper speaker unit 35 is seated in a saddle 28 carried by the back 30 of the lower speaker unit 25 for rotation with respect thereto. A stop 38 carried on the stem 36 of the upper speaker unit 35 limits the rotation of the upper speaker unit 35 with respect to the lower speaker unit 25 to 90° in either direction as seen, respectively, in FIGS. 2 and 3.

Even with the embodiment of FIGS. 1–3 wherein the lower speaker unit 25 is fixed relative to a base, a maximum potential of 210° coverage, when the speakers are offset 90° from each other as seen in FIGS. 2 and 3, is possible, in contrast with the 150° coverage afforded by the side-by-side, fixed speaker units currently in the market.

With reference, however, to FIGS. 4–11, a preferred embodiment of the instant inventive concepts can be seen at 40, wherein both the lower and upper speaker units, 45, 60, are rotationally carried on a single stem 70, having locking ribs 72 on its lower surface as seen particularly in FIG. 9, adapted to be engaged, as by snap-joint 74 seen particularly in FIG. 8, in a base element 90. With this embodiment, the stem 70 passes through saddles 46 and 61 on the lower and upper speaker units 45, 60, respectively, so that each unit can rotate relative to the stem 70 as seen, for example, in FIGS. 5 and 6 wherein the transducers of the speaker units can be offset from each other by as much as 180° (note FIG. 6). In this manner, a full 240° of coverage is possible.

Technically, the same concepts can be used to rotationally mount three speaker units relative to each to provide a full 360° coverage.

The specific physical constructional details of each of the speaker units for either of the embodiments of this invention are not critical to the instant inventive concepts and, in many respects, are quite similar to prior art ultrasound units. For example, with reference to FIG. 10, each of the speaker units or "eyeball assemblies" 45, 60 will include front housing elements 48, 62 and back housing elements 50, 64, a metal grill 50, 66, a buzzer 52, 67 and a buzzer housing 54, 68, respectively. The stem 70 can be formed from two elements 70a, 70b to facilitate assembly.

Figure 11:
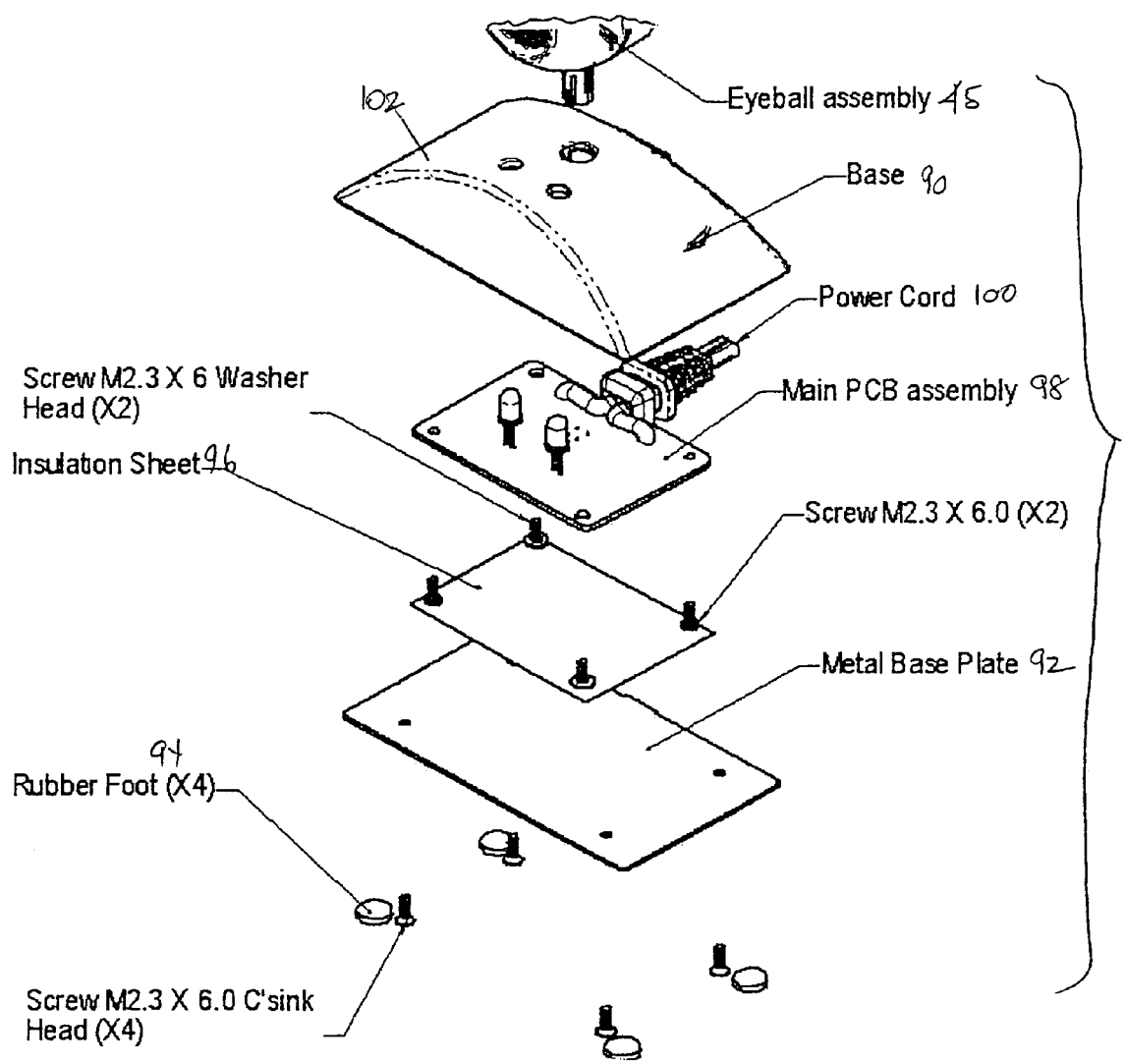
FIG. 11 is an exploded view showing the elements forming the base unit adapted to receive the vertical stem of the speaker assembly.

As seen in FIG. 11, the base unit 90 may comprise a base plate 92 which may be supported on rubber feet 94, a sheet of insulation 96, a main PCB assembly 98, which is conventional, with a power cord 100 and a base cover 102.

Each of the speaker units commonly beam a barrage of ultrasonic waves in excess of 130 dB while pulsing in a frequency range of 32 kHz to 62 kHz, although the sound waves may be adjusted, as necessary, to repel selected pests without annoying humans.

Considering the foregoing, it will now be seen that there is herein provided multiple-speaker pest repellents which meet all of the objects of the instant invention, and others, including many advantages of great commercial potential.

The foregoing descriptions and drawings should be considered as illustrative only of the principles of the invention. As noted, the invention may be configured in a variety of shapes and sizes and is not limited by the dimensions of the preferred embodiment. Numerous applications of the present invention will readily occur to those skilled in the art. Therefore, it is not desired to limit the invention to the preferred embodiments or the exact construction and operation shown and described. Rather, all suitable modifications and equivalents may be resorted to falling within the scope of the invention.

What is claimed is:

1. In a pest repeller for broadcasting electronically-generated ultrasonic sound waves, the improvement which comprises:

at least a first and a second ultrasound transmitter;

each of said transmitters including a housing having a top, a bottom, a front, and a rear;

a speaker within each housing for emitting ultrasonic sound waves from said front of said housing, said speaker having a back member;
a source of electrical power for each of said speakers;
a base member;
said first transmitter being supported by said base member and carrying a saddle; and
said second transmitter being supported by said first transmitter for rotation with respect thereto, said second transmitter carrying a mounting post having a lower portion extending below said bottom of said second transmitter housing, said lower portion of said mounting post being rotatably supported by said saddle.

2. The improvement of claim 1 wherein each of said speakers emits ultrasonic sound waves in a cone-like pattern from said front of its respective housing.

3. The improvement of claim 1 wherein said first transmitter is supported in a fixed relation by said base.

4. The improvement of claim 3 further including a supporting stem carried by said first transmitter and having portions extending below said bottom of said first transmitter housing, a socket in said base member, and quick connection means non-rotatably securing lower terminal portions of said supporting stem in said socket.

5. The improvement of claim 1 further including a stop element limiting the extent of rotation of said lower portion of said mounting post in said saddle.

6. The improvement of claim 5 wherein said saddle is carried by said back member of said speaker of said first transmitter.

7. The improvement of claim 6 wherein said housing of each transmitter includes a rear cover securable over said back member of its respective speaker.

8. The improvement of claim 6 wherein said stop element is a protuberance extending outwardly from said lower portion of said mounting post and engaging different portions of said back member of said speaker upon rotation of said mounting post in opposite directions.

9. The improvement of claim 1 wherein said mounting post is hollow, and said source of electrical power includes electrical wires extending through said mounting post into said second transmitter housing and being electrically connected to said speaker in said second transmitter housing.

10. The improvement of claim 1 wherein said first transmitter is rotatably supported by said base member.

11. The improvement of claim 1 wherein said mounting post is hollow and said source of electrical power includes electrical wires extending through said mounting post into each of said first and second transmitter housings and electrically connected to said speaker in each of said transmitter housings.

12. In a pest repeller for broadcasting electronically-generated ultrasonic sound waves, the improvement which comprises:
at least a first and a second ultrasound transmitter;
each of said transmitters including a housing having a top, a bottom, a front, and a rear;
a speaker within each housing for emitting ultrasonic sound waves from said front of said housing, said speaker having a back member;
a source of electrical power for each of said speakers;
a base member;
said first transmitter being supported by said base member and carrying a saddle; and
said second transmitter being supported by said first transmitter for rotation with respect thereto, said second transmitter carrying a supporting post having a portion extending below said bottom of said second transmitter housing, passing rotatably through said saddle and extending below said bottom of said first transmitter housing.

13. The improvement of claim 12 further comprising a socket in said base member, and a quick connection component securing a lower terminal portion of said supporting post in said socket.

14. The improvement of claim 12 wherein said supporting post is hollow and said source of electrical power includes electrical wires extending through said supporting post into each of said first and second transmitter housings and electrically connected to said speaker in each of said transmitter housings.

15. The improvement of claim 12 wherein said saddle is carried by said back member of said speaker of said first transmitter.

16. The improvement of claim 15 wherein said housing of each transmitter further includes a cover securable over said back member of its respective speaker.

17. The improvement of claim 15 further including a stop element limiting the extent of rotation of said supporting post in said saddle.

18. The improvement of claim 17 wherein said stop element is a protuberance extending outwardly from a lower portion of said supporting post and engaging different portions of said back member of said speaker upon rotation of said supporting post in opposite directions.

19. The improvement of claim 12 wherein each of said speakers emits ultrasonic sound waves in a cone-like pattern from said front of its respective housing.

* * * * *